United States Patent
Gasparetto

(10) Patent No.: US 8,684,518 B2
(45) Date of Patent: Apr. 1, 2014

(54) MINIATURIZED ELASTIC HINGE, IN PARTICULAR FOR EYEGLASSES

(71) Applicant: Michela Gasparetto, Susegana (IT)

(72) Inventor: Michela Gasparetto, Susegana (IT)

(73) Assignee: IDEAL S.R.L., Quero (BL) (IT)

( * ) Notice: Subject to any disclaimer, the term of this patent is extended or adjusted under 35 U.S.C. 154(b) by 0 days.

(21) Appl. No.: 13/797,178

(22) Filed: Mar. 12, 2013

(65) Prior Publication Data

US 2013/0201438 A1 Aug. 8, 2013

Related U.S. Application Data

(63) Continuation of application No. PCT/IB2011/000020, filed on Jan. 4, 2011.

(30) Foreign Application Priority Data

Sep. 17, 2010 (IT) ................................ VI2010A0253

(51) Int. Cl.
   *G02C 5/22* (2006.01)

(52) U.S. Cl.
   USPC .............................. 351/153; 351/113; 16/228

(58) Field of Classification Search
   CPC ........ G02C 5/16; G02C 5/22; G02C 2200/26; G02C 5/2227; G02C 5/2254; G02C 2200/22; G02C 5/2236; G02C 5/2263; G02C 2200/28; G02C 5/08; G02C 5/122; G02C 5/2272; G02C 9/02; G02F 1/133; G02F 2001/02
   USPC .................... 351/153, 113, 114, 111; 16/228
   See application file for complete search history.

(56) References Cited

U.S. PATENT DOCUMENTS

| 7,264,349 | B1 | 9/2007 | Ku ................................. 351/153 |
| 7,735,193 | B2* | 6/2010 | Buchegger ....................... 16/228 |
| 7,946,704 | B2* | 5/2011 | Buchegger ...................... 351/153 |
| 2006/0179609 | A1 | 8/2006 | Huang ............................ 16/228 |
| 2009/0284710 | A1 | 11/2009 | Montagner .................... 351/153 |
| 2010/0128219 | A1 | 5/2010 | Sprickler ....................... 351/153 |

FOREIGN PATENT DOCUMENTS

| EP | 2 009 484 A1 | 12/2008 | ............... G02C 5/22 |
| EP | 2 163 938 A1 | 3/2010 | ............... G02C 5/22 |
| GB | 465678 | 5/1937 | |
| WO | WO 97/45763 | 12/1997 | ............... G02C 5/22 |
| WO | WO 2004/040355 | 5/2004 | ............... G02C 5/22 |

* cited by examiner

*Primary Examiner* — Hung Dang
(74) *Attorney, Agent, or Firm* — Fattibene and Fattibene LLC; Paul A. Fattibene

(57) ABSTRACT

An elastic miniaturized hinge used in eyeglasses. A first element fixed to the front portion of eyeglasses, and a second element fixed to a temple of the eyeglasses, said first and second elements are rotatably fixed to each other by means of a shaft. A first end portion of the shaft rotatingly fixed to the first element, a portion of the shaft adjacent to the first end portion housed in a through hole made in the second element. A second portion of the shaft is housed in the internal space of a helical elastic and fixed to the shaft, so that the rotation of the shaft and therefore of the second element with respect to the first element is counteracted by the action of the helical elastic.

19 Claims, 9 Drawing Sheets

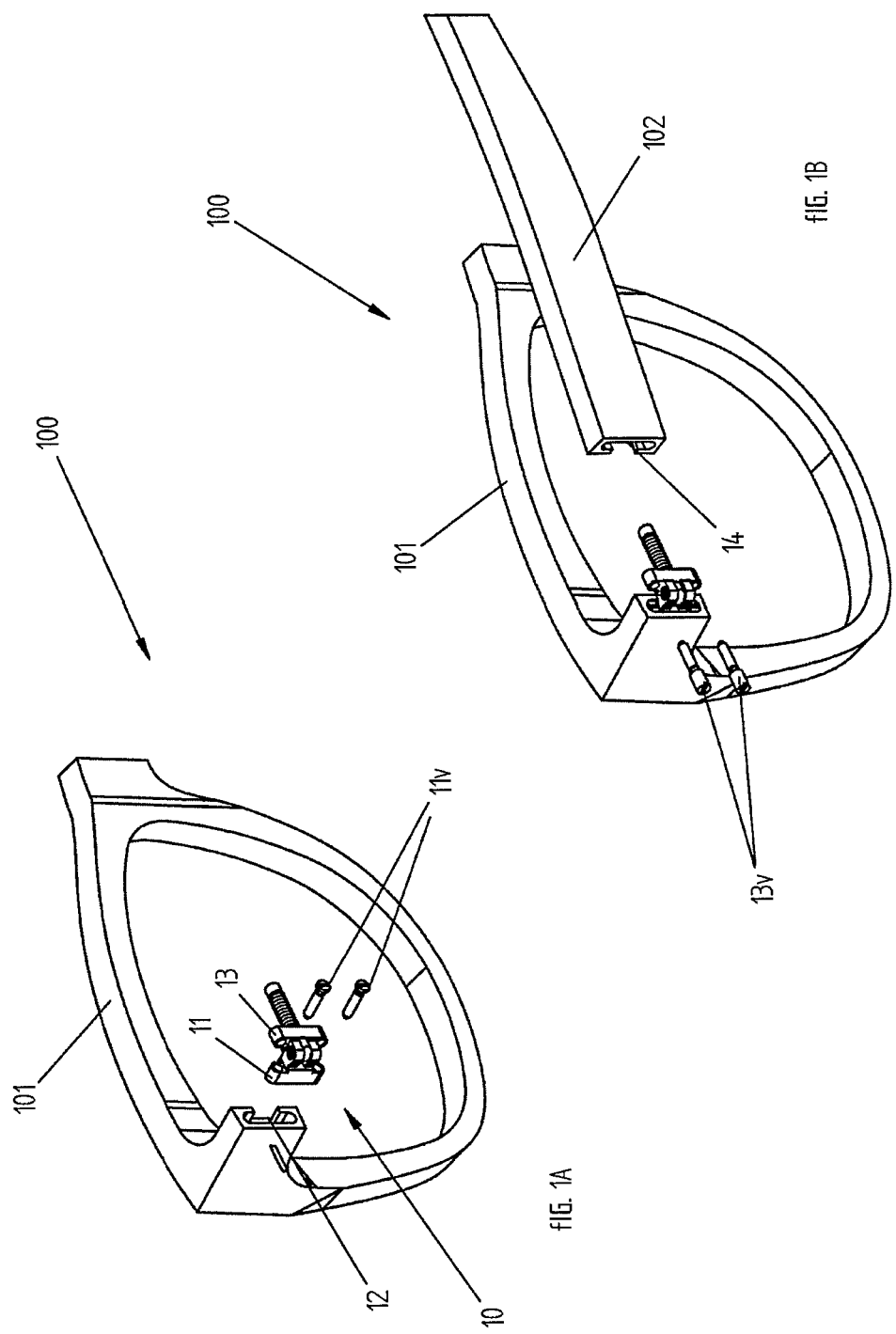

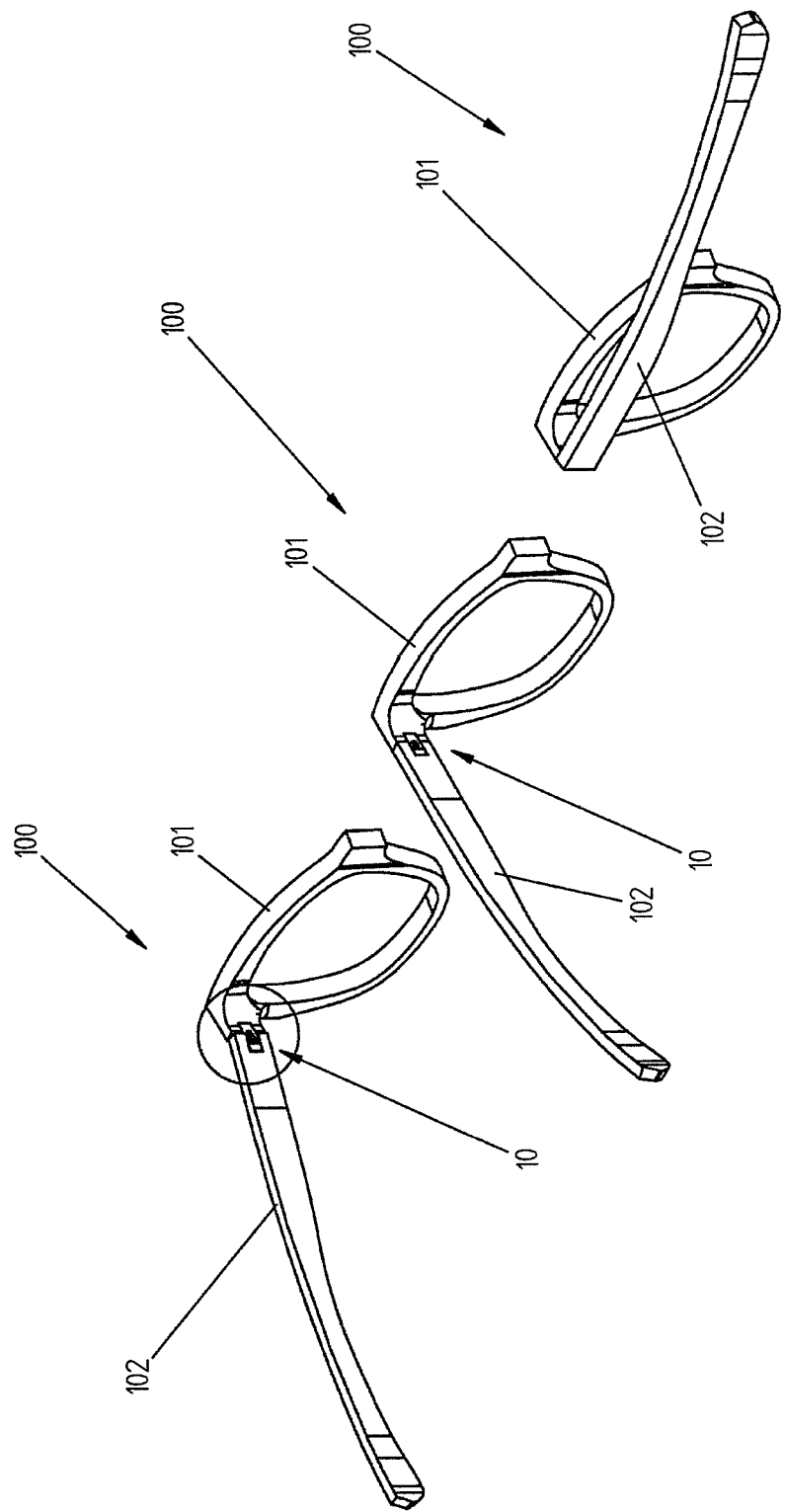

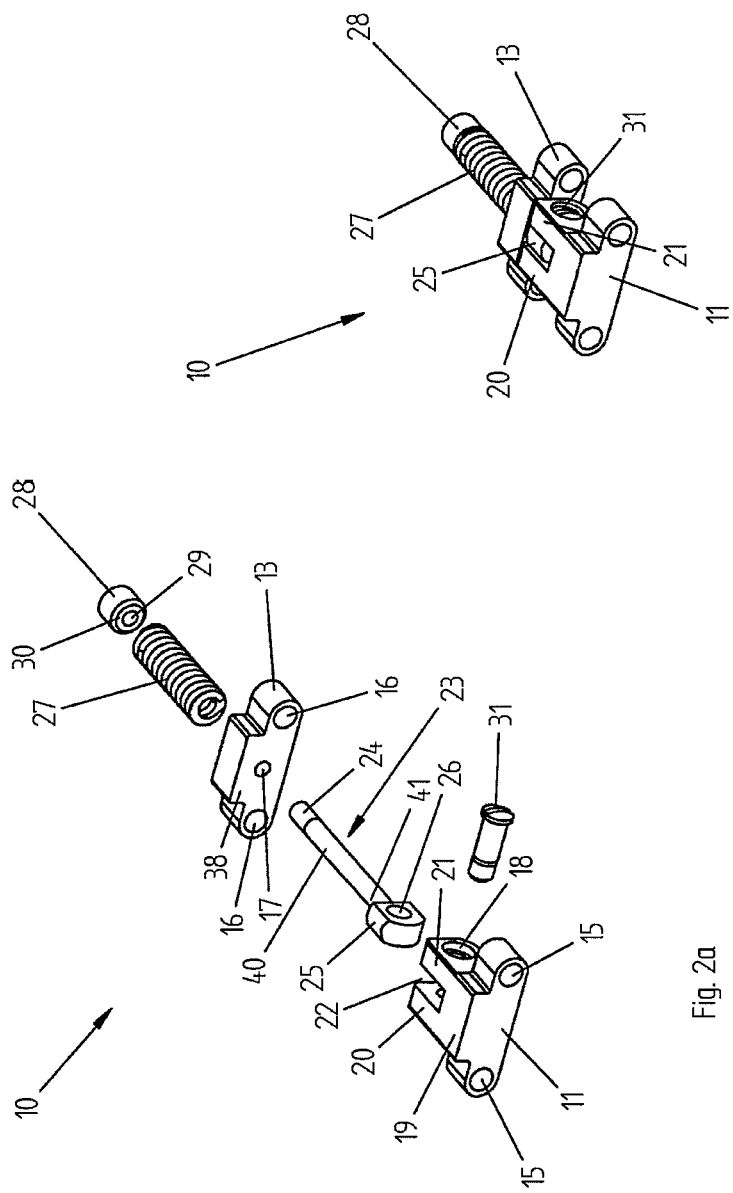

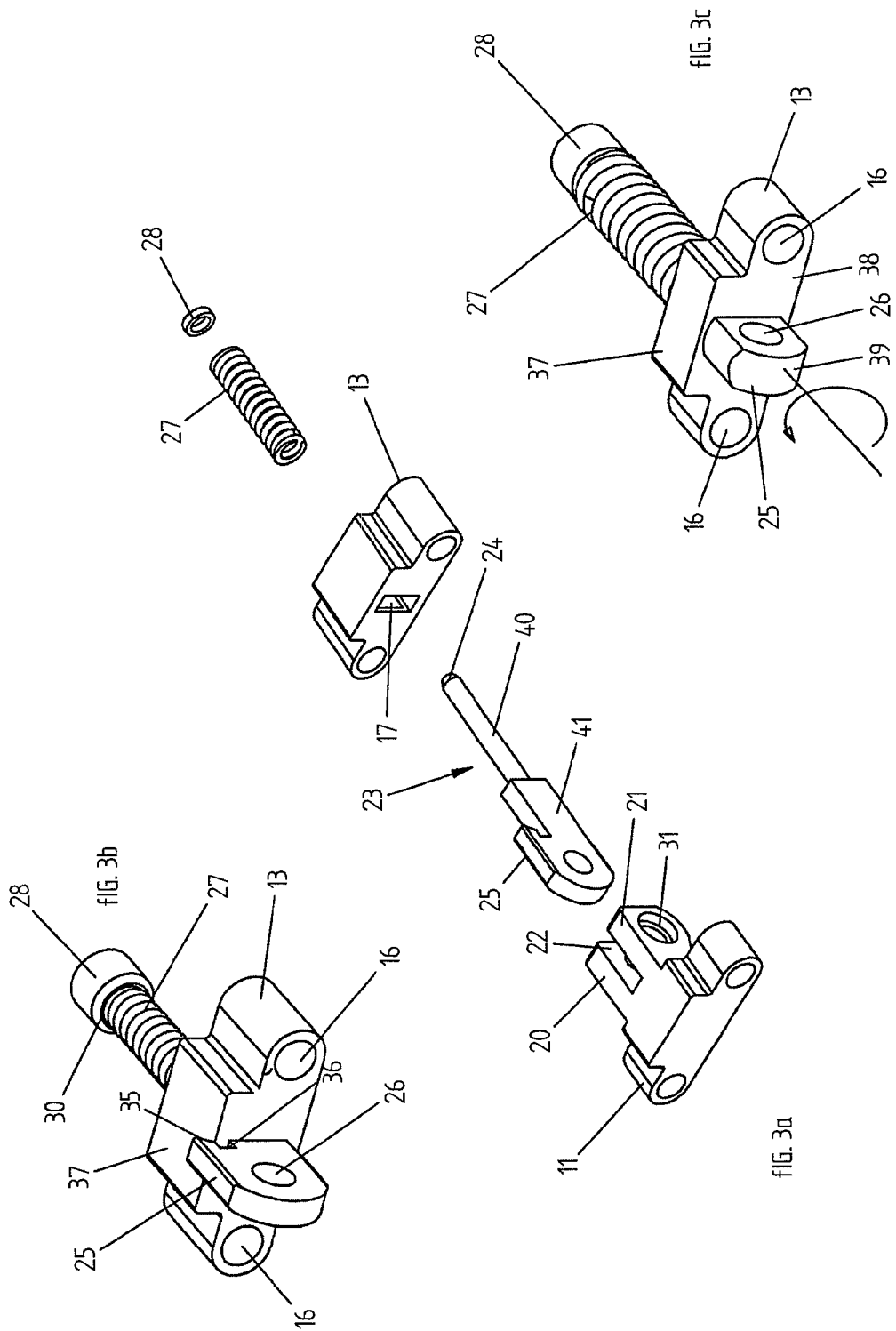

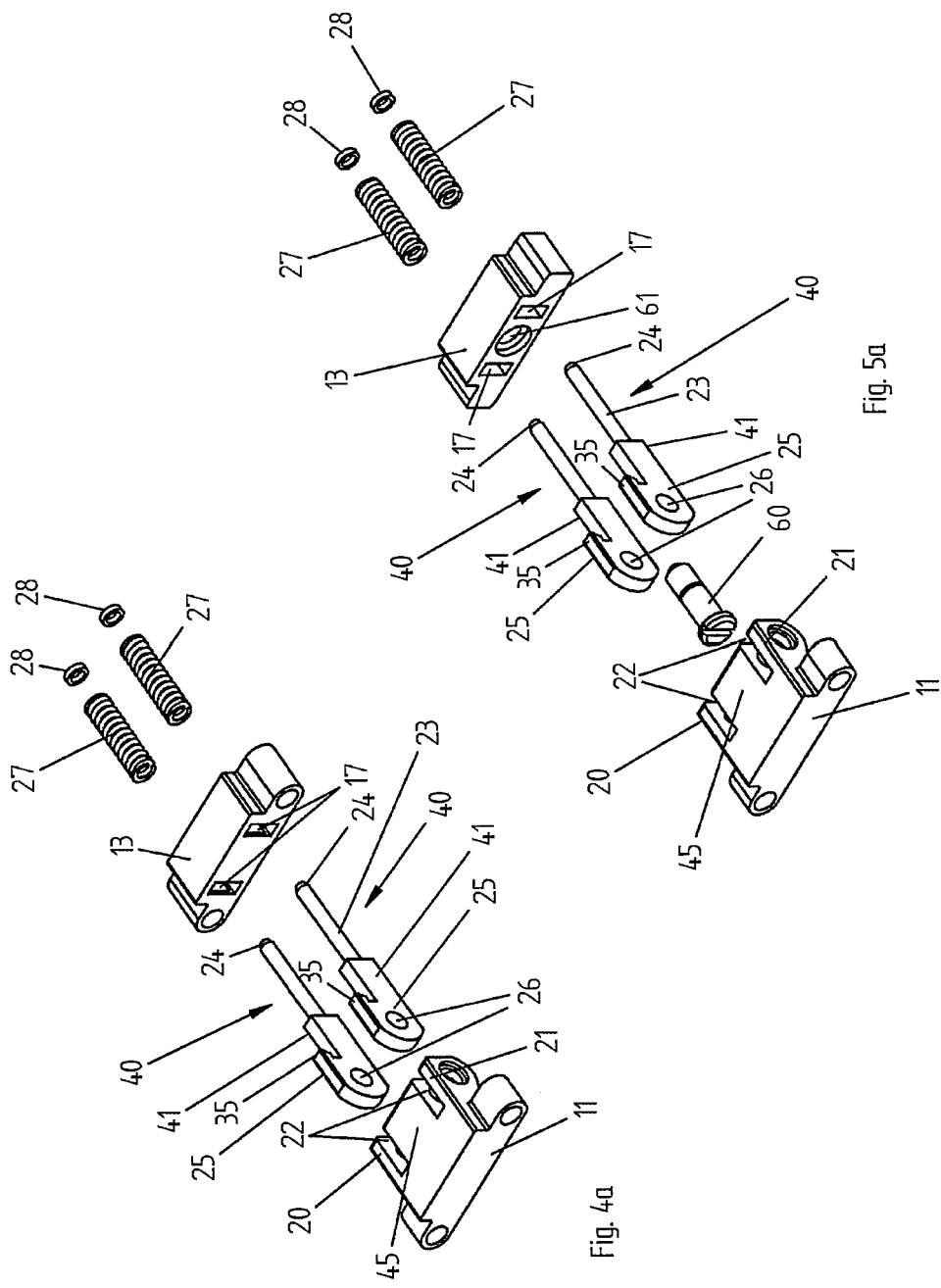

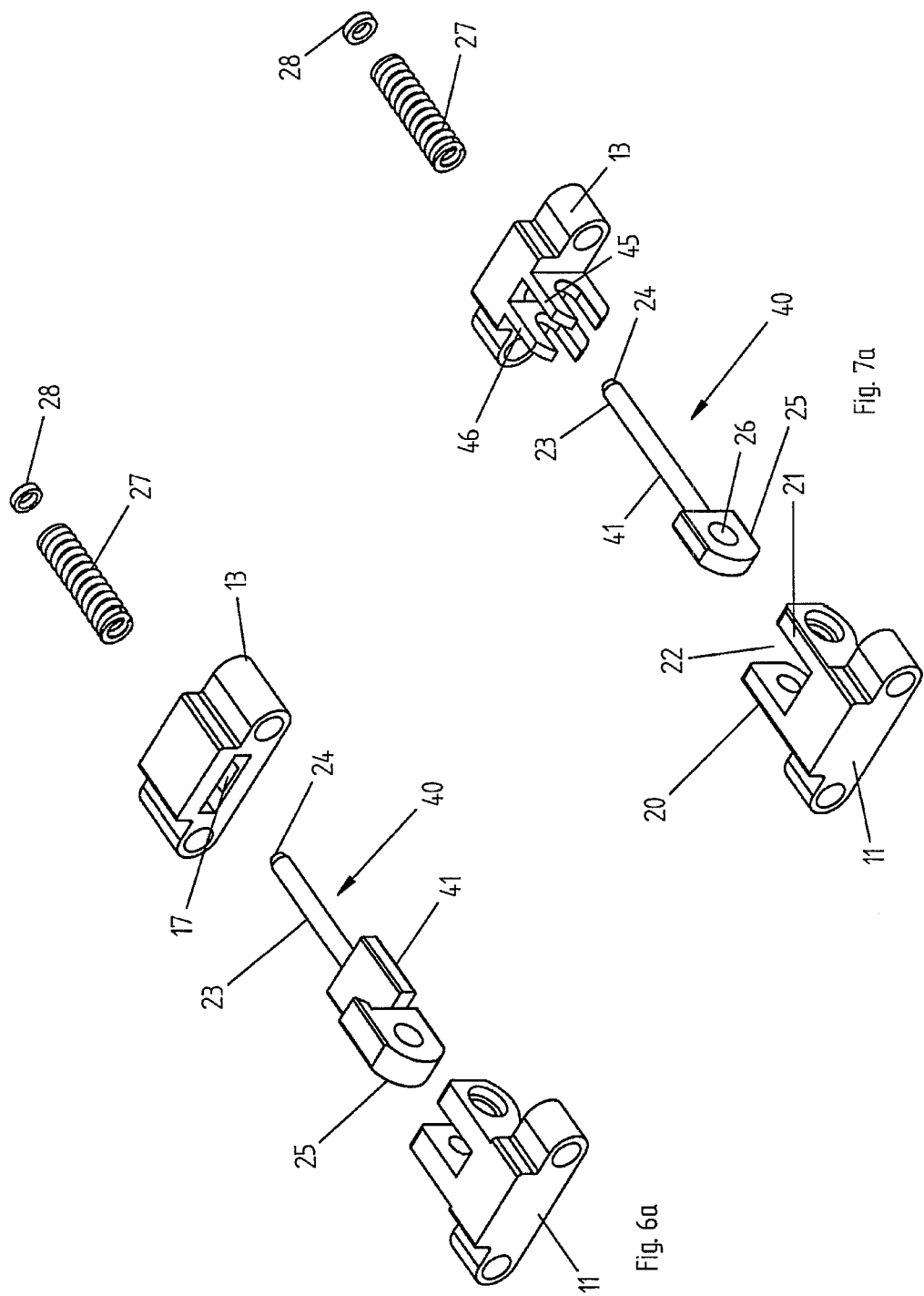

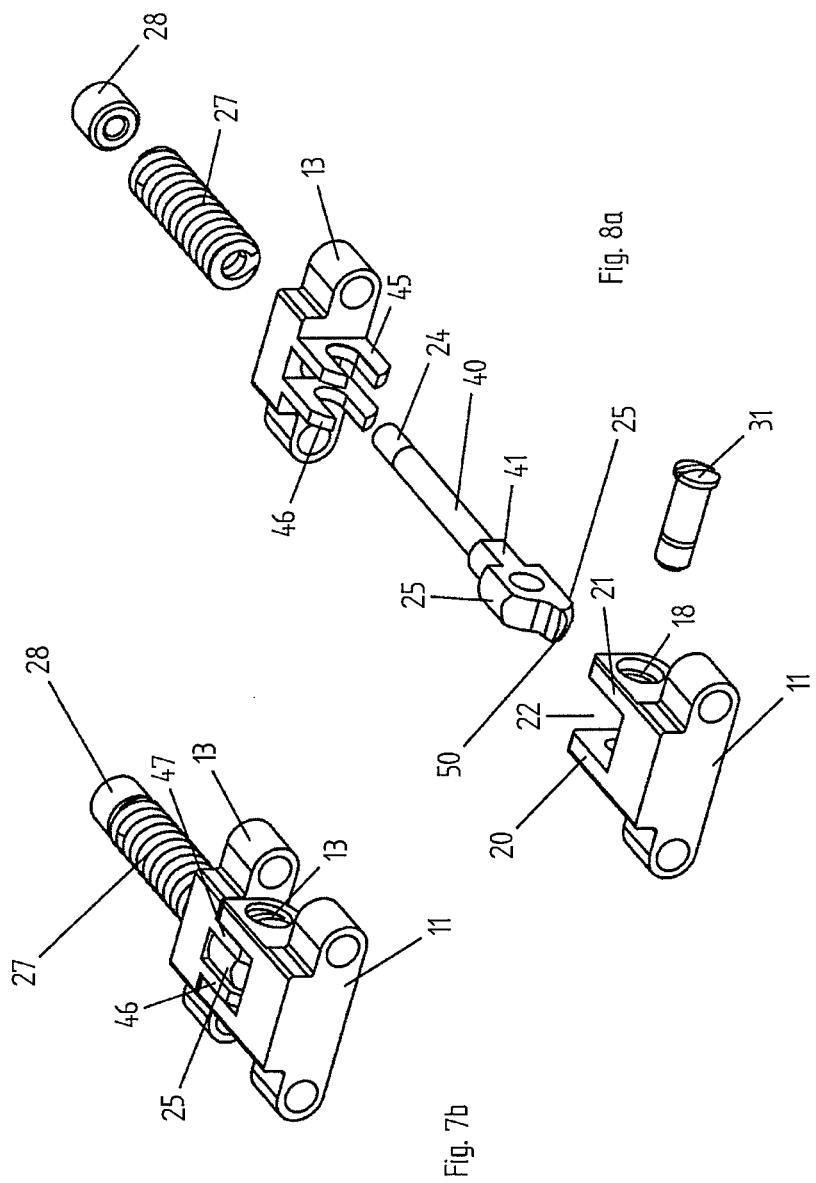

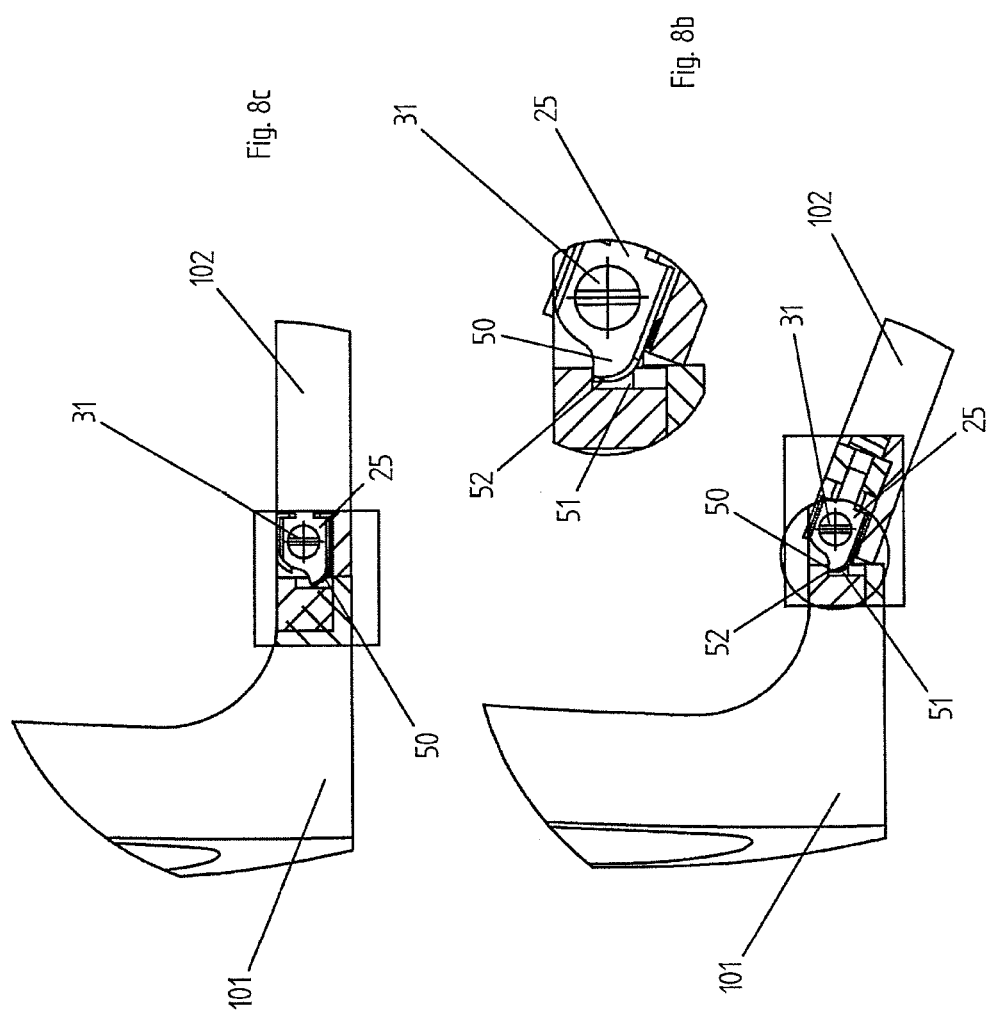

MINIATURIZED ELASTIC HINGE, IN PARTICULAR FOR EYEGLASSES

RELATED APPLICATIONS

This is a continuation of International Application PCT/IB2011/000020, with an international filing date of Jan. 4, 2011, now abandoned, which is herein incorporated by refereance, and claims priority on Italian application no. VI2010A000253 filed Sep. 17, 2010.

FIELD OF THE INVENTION

The present invention concerns the technical field of joints (in particular to the articulated joints) or hinges. In particular, the present invention is related to the technical field of elastic joints or hinges. Even more particularly, the present invention concerns the field of miniaturized elastic joints or hinges, suited in particular to be applied to eyeglasses or similar accessories. In greater detail, the present invention concerns a miniaturized elastic hinge for eyeglasses of the extraflex type.

BACKGROUND OF THE INVENTION

Elastic and miniaturized joints or hinges are known in the state of the art. Said hinges are used in particular in the case of extra flex eyeglasses. The term "extra flex hinges or joints" means, in particular, hinges or joints in which the rotation of a hinge element in relation to the other hinge element is regulated by elastic means, like for example springs or similar means. In particular, the rotation of a hinge element in relation to the other hinge element and therefore, in the particular case of eyeglasses, of one part of the eyeglasses in relation to the front of the eyeglasses, is obtained by counteracting the elastic force of said elastic means or springs. Due to the elastic force, therefore, one hinge element tends to return to predefined positions, and therefore, for example, the temples of a pair of eyeglasses tend to return to predefined positions. For example, the elastic means will tend to maintain the temples of a pair of eyeglasses in the position in which the eyeglasses can be worn; if the temples are moved from this position, they will return to their original position as soon as they are released thanks, in fact, to the action of the elastic means. The above applies also to the case where the temples are folded, for example in the position suited to allow the eyeglasses to be placed in a case. The opening of the temples can be achieved by counteracting the action of the elastic means. The temples will assume the complete opening position if they are rotated by a minimum angle, beyond which the elastic means will force them into the open position. If, on the other hand, the rotation angle is smaller than said minimum angle, when the temples are released they will return to the folded position. The hinges of the extra flex type also allow the temples to be opened beyond the open position (that is, the position that allows the eyeglasses to be worn), and therefore in such a way as to define an angle that is larger than 90° with respect to the front portion of the eyeglasses. As previously explained, when the temples are released, thanks to the action of the elastic means they automatically return to the maximum opening position, in which each one of the temples defines an angle of substantially 90° with the front portion of the eyeglasses.

In the design and development of hinges for eyeglasses, in particular in the design and development of miniaturized elastic hinges, even of the extra flex type, for eyeglasses, there are many factors to be taken in consideration, as the functions that the hinges of this type must perform and guarantee are multiple and different from one another.

A first factor is aesthetic, as the hinges must not be too cumbersome and therefore not too visibile, so that they must be housed partially inside the front portion of the eyeglasses and partially inside the corresponding temple or side. A second factor is related to mechanical reliability, as the hinges or joints must on one side allow the desired rotations and on the other avoid undesired rotations. Furthermore, the hinges must guarantee a minimum duration and be free from breakages or drawbacks that affect their operation, in such a way as to limit repair costs as much as possible. Always with reference to their mechanical reliability, they must guarantee the stability of their open or closed position, as well as the automatic return to said open or closed positions when they are rotated. Rotation plays or slacks must also be avoided in every position of the hinge, and therefore of the temple with respect to the front portion of the eyeglasses. Even after a relatively long time of usage said plays or slacks should not be present. It should also be possible to adjust the hinges so as to adapt them to special needs or conditions of use. The application or assembly of the hinges, for example on eyeglasses, should possibly be simple and quick, so as to ensure savings in the assembly costs. Also the assembly of the hinges should possibly be simplified, so that the number of component parts may be reduced, in any case guaranteeing the functionality characteristics described above. Finally, in particular in the case of extra flex hinges, they must allow an extra opening angle that is wide and constant over time.

In the state of the art it is known that the manufacturers of miniaturized elastic joints and hinges, as well as the manufacturers of eyeglasses, have made many attempts to design and produce hinges and joints capable of satisfying the needs described above; unfortunately, however, the various attempts made have not achieved the desired results. For example, in the cases where the aesthetic aspect has been privileged, thus opting for simple solutions form the technical point of view, for example characterized by a reduced number of component parts and therefore not too cumbersome, said solutions have proved to be insufficiently reliable from the mechanical point of view, delicate even though simple, and limited from the point of view of performance in terms of rotation capacity, amplitude of the opening angle and elasticity. On the contrary, the solutions in which the mechanical aspect has been privileged and which are therefore characterized by fine mechanics and by a high number of component parts have proven to be unsatisfying or even impracticable because they were bulky and unsuited to be hidden or hardly visible and to be housed in the parts of the eyeglasses. Other solutions, that on the other hand are quite satisfying from the aesthetic point of view, have proven to be difficult to assembly and therefore impracticable due to the high costs involved.

By way of example, it is possible to refer to a solution known in the state of the art, characterized by limited size and overall dimensions and provided with a flex mechanism, suited to be mostly housed in the parts of the eyeglasses and therefore to be hidden or hardly visible. This solution or mechanism, however, does not allow the elastic means to be made more rigid, unless the dimensions of said mechanism are increased, so that its application to relatively heavy eyeglasses, like the ones that could be naturally combined with this type of mechanism, makes the temple unstable in its fixed positions (open and closed). The mechanism according to this solution, furthermore, can be neither set nor adjusted, as the two base elements that make it up, which are suited to be respectively fixed to the front portion and to the temples of the eyeglasses, are connected to each other by means of a small pin instead of a screw. The replacement of this pin, if it should break or be lost, would be difficult if it had to be carried out with tools usually available to both the final user or a technical expert in the field, for example an optician. This solution, therefore, does not meet the need to guarantee simple assembly and maintenance. Finally, in the mechanism carried out according to this solution, the elastic element (spring) is located in a definitely unstable position, so that in case of impact it could move out of its seat and thus affect the functionality of the eyeglasses. The mechanism carried out according to this solution, therefore, does not meet the need for mechanical reliability, either.

According to another solution known in the state of the art, the mechanism proposed is intended to be permanently assembled by the user. This prevents many users from using it. The assembly of the mechanism, independently of whether it is carried out by the final user or by a technician, is extremely complex, since the same mechanism comprises a box-shaped element in which two distinct and therefore not interchangeable elements must be inserted, which must be kept in position through the application of a lid (to be applied to the box-shaped element) that is difficult to handle and must be oriented in a predefined way. Furthermore, regarding the application of the mechanism to eyeglasses or similar accessories, it must be noted that once the assembly of the front and the temple of the eyeglasses has been completed (with the mechanism interposed between them), the front and temple feature an unacceptable rotation play or slack that would be further amplified in case of application to eyeglasses with rather large temples. The mechanism carried out according to this further second solution does not include elements suited to ensure its mechanical locking, so that the possible applications of the same mechanism are limited only to the case of eyeglasses that allow a deformation of the temple and/or front portion. It is therefore necessary to exclude the application of the mechanism to eyeglasses made of rigid materials, like for example wood or natural materials in general. Finally, in case of application to eyeglasses made of deformable materials, said application is however difficult and mistakes are likely to be made, for example in the case of metallic materials or acetate.

Further examples of an elastic miniaturized hinge according to the prior art are known from documents EP2009484 A1, WO97/45763 A1, WO2004/040355 A1, EP1666952 A1, U.S. Pat. No. 7,264,349 B1, EP2120087 A1 and EP2163938 A1.

SUMMARY OF THE INVENTION

It is therefore one object of the present invention to overcome the drawbacks summarised above and typical of the joints or hinges known in the state of the art. A further object and aim of the present invention is to provide a joint or hinge, in particular a miniaturized and elastic joint or hinge, that is a convenient compromise between the different needs for mechanical reliability, pleasant appearance, reduced size and overall dimensions, simple assembly and maintenance. In particular, the objects and aims that the present invention intends to achieve can be summarised as follows.

It is one of the objects of the present invention to considerably reduce the overall dimensions thanks to an elastic closing, opening and if necessary extra opening elastic mechanism that makes it possible to completely eliminate the presence of external elements from the temple of the eyeglasses (for example tiny boxes).

It is another object of the present invention to guarantee, even in the presence of thin temples, the characteristic snap-in action, thus also guaranteeing the stability of the temple in its natural rest positions (open and closed).

It is a further object of the present invention to completely eliminate all the rotation plays or slacks between the temple and the front portion of the eyeglasses, in particular in every position of the temple (even intermediate) included between the closed position and the open position, and if necessary even the extra opening position.

It is a further object of the invention to allow temples to be developed and used that, the minimum dimensions necessary to contain the mechanism according to the present invention being exceeded, can assume any shape and size, the possible shapes not being affected by the presence of external elements.

It is another object of the invention to ensure that the eyeglasses to which the mechanism is applied are very solid and stable in the area of the joint or hinge.

It is another object of the invention to allow a constant extra opening angle to be reached even when the thickness of the temple varies (at least within certain limit values), thanks to the implementation of a special end of stroke solution.

The set objects described above are achieved through the construction of a joint (or articulated joint) or hinge as disclosed.

The present invention is particularly suited to be used for the assembly of eyeglasses or similar accessories, in particular to be used to rotatingly couple the temple of a pair of eyeglasses and the front portion of said eyeglasses with each other. Therefore, this is the reason why below is a detail description of the joint or hinge carried out according to the present invention, with particular reference to its application to eyeglasses. It should however be noted that the possible applications of the present invention are not limited to eyeglasses.

On the contrary, the present invention can be and is conveniently applied also in other fields, and in particular in all the cases where there is the need for a joint or hinge with reduced size or even miniaturized that is characterized by a pleasant appearance, reduced overall dimensions and size, mechanical reliability, mechanical functionality, duration, and simple assembly.

The present invention is based on the general consideration that the objects previously summarised can be achieved and the problems typical of the solutions known in the art can be solved and overcome through the construction of a hinge in which the elastic elements and the connection element between a hinge element and the other hinge element are mutually positioned in a convenient way. In particular, the present invention is based on the general consideration that the set objects can be achieved and the problems of the solutions known in the art can be solved by means of a hinge in which the elastic element or spring is positioned on the connection element or shaft so that said shaft is at least partially housed in the internal space defined by the spring. In this case, the internal space defined by the spring, not used in the case of the solutions known in the art, is properly exploited and it is not necessary any more to find a suitable location and a space for the connection shaft. Furthermore, in this way both the elastic element and the connection shaft can be housed inside a portion of the eyeglasses, for example the temple, thus eliminating the presence of elements outside the eyeglasses, with evident advantages from the aesthetic point of view. The absence of external elements, together with the fact that the connection shaft is at least partially housed and accommodated in the internal space defined by the elastic element, also makes it possible to use an elastic element or spring of considerable size, and therefore considerably rigid, with clear advantages in terms of mechanical performance, as the snap-in action (of the elastic element) that ensures the stability of the temple in its natural rest positions (open and closed) will be more evident. The proposed solution also makes it possible to obtain, with the same overall dimensions of the hinge, known solutions or, vice versa, to obtain overall dimensions of the hinge that are smaller compared to the hinges that adopt known solutions. In order to properly accommodate the elastic element in the temple it will be sufficient to provide the temple with a hole having a diameter slightly larger than that of the spring. Furthermore, as the spring is housed in the connection element or shaft and in a closed hole, any risk of the spring or elastic element coming off its seat (blind hole in the temple) will be avoided. And again, since the spring or elastic element is guided by the connection shaft and locked at the two opposite ends of the same shaft, the risk of the spring or elastic element being in some way released from the shaft will be avoided; it will thus be possible to assemble the spring or elastic element as well as the entire hinge or joint, and simply apply the pre-assembled hinge to a pair of eyeglasses or a similar item. In particular, concerning the application of the hinge or joint according to the present invention to a pair of eyeglasses, the application itself is particularly simplified, as it can be obtained through fixing means like screws that are engaged with the parts of the eyeglasses to be connected by means of the hinge or joint. According to a particular embodiment of the present invention it will be possible to precisely define the extra opening angle, with no risk of the same angle varying over time or due to the wear of the joint or hinge.

BRIEF DESCRIPTION OF THE DRAWINGS

The present invention is further described and illustrated here below, with particular reference to the enclosed drawings. It should however be noted that the present invention is not limited to the embodiments illustrated in the enclosed drawings but rather that the present invention covers all the modifications made to the embodiments described and illustrated herein that are clear, evident and obvious to any person skilled in the art.

In particular, in the enclosed drawings:

Figure 1C:
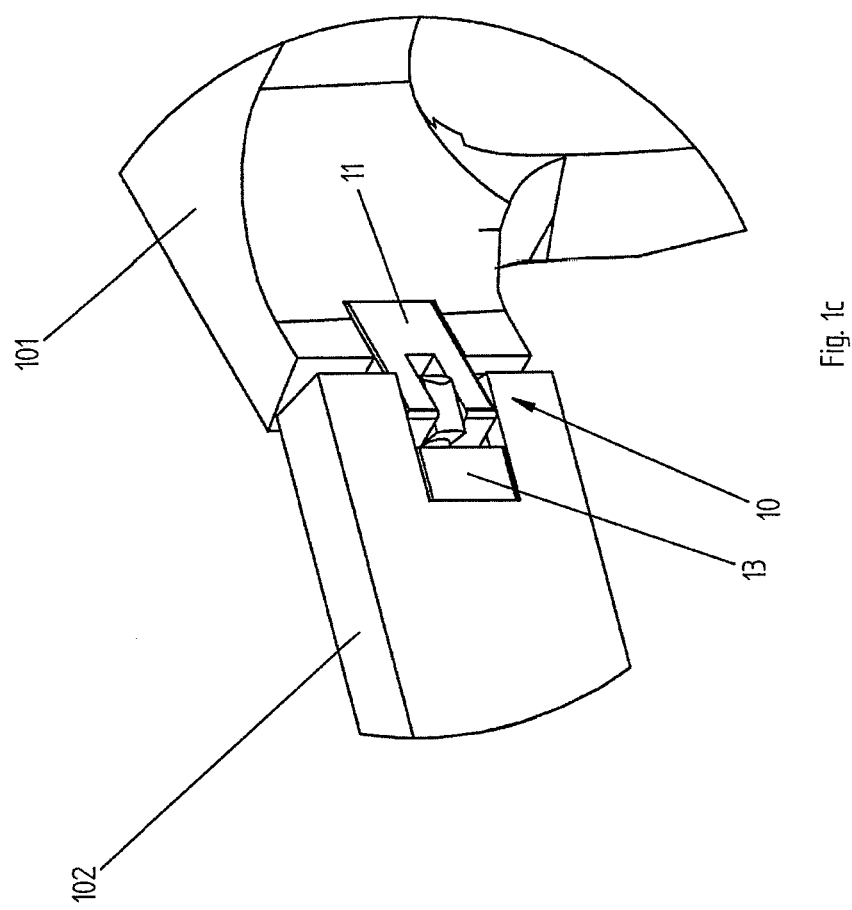

Figures from 1a to 1d show exploded views of a pair of eyeglasses equipped with a hinge or joint carried out according to the present invention;

FIGS. 2a and 2b show exploded views of a hinge or joint carried out according to a particular embodiment of the present invention, in particular when the pre-assembly and assembly has been completed;

FIG. 3a shows an exploded and perspective view of a hinge or joint carried out according to a further embodiment of the present invention;

FIG. 3b shows a perspective view of one of the two hinge elements of the hinge according to the embodiment of the present invention already illustrated in FIG. 3a;

FIG. 3c shows a perspective view of one of the two elements of the hinge according to the embodiment of the present invention already illustrated in FIGS. 2a and 2b;

FIG. 4a shows an exploded view of a hinge or joint according to a further embodiment of the present invention;

FIG. 5a shows an exploded view of a hinge or joint according to a further embodiment of the present invention;

FIG. 6a shows an exploded view of a further embodiment of the hinge or joint according to the present invention;

FIGS. 7a and 7b respectively show an exploded view and a perspective view of a hinge or joint according to a further embodiment of the present invention;

FIGS. 8a, 8b and 8c respectively show an exploded view and two top views of a hinge or joint according to a further embodiment of the present invention.

DETAILED DESCRIPTION OF SOME EMBODIMENTS OF THE PRESENT INVENTION

Figures from 1a to 1d show a pair of eyeglasses 100 and parts of the same. In particular, the eyeglasses 100 typically comprise a front portion 101 suited to rest on the user's nose and in front of his/her eyes during use of the eyeglasses 100, as well as a right and a left temple or side 102, suited to be positioned, always during use, respectively between the right and left pavilion of the ear and the head of the user. For the sake of clarity and simplicity, only the temple or side 102 is shown in Figures from 1a to 1d. The eyeglasses 100 are equipped with a hinge or joint 10 according to the present invention. Said hinge or joint 10 comprises in particular a first hinge element 11 and a second hinge element 13 that are rotatingly constrained to each other. While other details concerning the hinge or joint 10 will be illustrated further on in the description, at this point it can be noted in Figures from 1a to 1d that the first element 11 and the second element 13 are suited to be respectively fixed to the front portion 101 and to one of the temples or sides of the eyeglasses 100, in particular, in the case of Figures from 1a to 1d, to the left temple or side 102. The first hinge element 11 is thus suited to be inserted in and fixed to a corresponding seat 12 created in the front portion 101 of the eyeglasses 100; in the same way, the second hinge element 13 is suited to be inserted in and fixed to a corresponding seat 14 created in the temple 102. For this purpose, the housing seats 12 and 14, respectively of the first hinge element 11 and of the second hinge element 13, will have shape and dimensions (depth, width, cross section etc) corresponding to those of the hinge elements 11 and 13. The correspondence between the dimensions, in particular, will be such as to provide for a minimum play or slack between the hinge elements 11 and 13 and the corresponding housing seats 12 and 14, in order to allow the hinge elements 11 and 13 to be easily inserted in as well as easily removed from the corresponding housing seats. The definitive anchorage of the hinge element 11 (in the corresponding seat 12) and of the hinge element 13 (in the corresponding housing seat 14) will be obtained through corresponding and suitable fixing means like for example screws 11v and 13v. In particular, in the case of the hinge element 11, the two fixing screws 11v will be housed and accommodated in a corresponding number of through holes 15 (see in particular FIG. 2a), and will be engaged in the same number of blind and if necessary threaded holes (not visible in the figures) obtained in the front portion 101 of the eyeglasses 100. In the same way, the two fixing screws 13v will be housed and accommodated in a corresponding number of through holes 16 (see in particular FIG. 2a) and will be engaged in a corresponding number of blind and if necessary threaded holes (not visible in the figures) obtained in the temple or side 102 of the eyeglasses 100. It is thus possible to appreciate the extremely simple assembly of the eyeglasses 100, in particular of the operations necessary to fix the temples or sides to the front portion interposing hinges or joints 10 according to the present invention between said temples 102 and said front portion. For this purpose it will be possible, for example, to insert the first hinge element 11 in the corresponding seat 12 and to fix the same hinge element 11 to the housing seat 12 through the fixing screws 11v. In particular, in order to facilitate action on the fixing screws 11v (for example by means of a screwdriver)

it is advisable to orient the second hinge element 13 so that it defines an angle of substantially 90° with respect to the first hinge element 11 (closed position of the temples or sides with respect to the front portion 101). In this way the second hinge element 13 will not hinder or prevent access to the end portions of the fixing screws 11v on which the screwdriver or similar tool will intervene. In the same way, it will be possible to proceed, for example, by "inserting" the temple or side 102 in the second hinge element 13, so that the same second hinge element 13 is inserted in the corresponding housing seat 14, and by finally by fixing the same hinge element 13 in the housing seat 14 by means of the fixing screws 13v. Also in this case, in order to facilitate action on the fixing screws 13v (for example, again by means of a screwdriver) it is advisable to orient the second hinge element 13 so that it defines, with respect to the first hinge element 11 (and so that the temple 102 defines, with respect to the front portion 101 of the eyeglasses 100) an angle of substantially 90° (closed position of the temples or sides with respect to the front portion 101). In this way the first hinge element 11 will not hinder or prevent access to the end portions of the fixing screws 13v on which the screwdriver or a similar tool will intervene.

From the detail of FIG. 1d it is possible to observe that hinge or joint 10 according to the present invention can be of the extra flex type, that is, of the type allowing the temples or sides 102 to be opened beyond the position of use of the eyeglasses 100 (in which the temples 102 respectively form angles of substantially 90° with the front portion 101), until reaching positions in which the same temples 102 form corresponding angles of more than 90° with the front portion 101. It will be successively clear, in the following description, that the elastic nature of the hinge or joint according to the present invention will allow the temples 102 to naturally and automatically return to the open and closed positions. This means that if, for example, a temple is rotated beyond its open position and then released, the same will automatically return to the open position. In the same way, if a temple is rotated and moved from its closed position (and without reaching the open position) and successively released, the same will automatically return to the closed position. To rotate the temples from the closed position to the open position, it will therefore be necessary to exceed an angle or point of no return, beyond which the temples will automatically reach the desired position, respectively open or closed. When the angle or point of no return is exceeded, a sort of click is produced, which can be perceived by the user and is typical of elastic hinges or joints.

In the same way, in the detail shown in FIG. 1c it is possible to observe a particularly advantageous characteristic of the hinge or joint according to the present invention, that is, the fact that the parts making up the same will be almost completely housed in the parts of a pair of eyeglasses, and no external space of said parts will be occupied. In particular, the hinge element 13 can be completely housed inside the temple 102 while the hinge element 11 can be completely housed inside the front portion 101. Obvious aesthetic advantages derive from the above, since the hinge or joint 10 according to the present invention will be practically invisible, excluding parts of the same that are intentionally left visible, like for example, in the embodiments illustrated herein, those parts that are visible from the inside of the eyeglasses, like in the case of FIGS. 1b and 1c; in the embodiment of the invention mentioned above the housing seats 12 and 14 comprise one side open towards the inside of the eyeglasses 100, in order to facilitate access to the hinge or joint 10 or parts of the same, for example if there is the need for maintenance operations, adjustments, etc to be carried out on the hinge or joint itself It is clear that in other embodiments of the invention also other parts of the hinge can be visible inside and/or outside the eyeglasses, according to the desired technical and/or aesthetic characteristics.

Here below, with reference to FIGS. 2a and 2b, is the detailed description of a first embodiment of the hinge or joint according to the present invention; in FIGS. 2a and 2b the parts or characteristics of the hinge or joint 10 according to the present invention already described with reference to other figures are identified by the same reference numbers.

FIGS. 2a and 2b (in particular the exploded view of FIG. 2a) clearly show that, in the hinge or joint 10 according to the embodiment of the present invention illustrated therein, the first hinge or joint element 11 and the second hinge or joint element 13 are rotatingly constrained to each other by means of a constraint element or shaft 23. In particular, said constraint element or shaft 23 comprises a first end portion 25 housed (once the assembly of the hinge or joint 10 has been completed) between two projections 20 and 21 that define an internal space 22 housing and accommodating, in fact, the first end portion 25 of the shaft 23. The two projecting parts 20 and 21 face the second joint or hinge element 13 and are both provided with a through hole 18 suited to receive a pin 31. Also the end portion 25 of the connection shaft 23 is provided with a through hole 26. The shaft 23 will then be fixed to the joint or hinge element 11 by inserting its end portion 25 in the internal space 22 defined by the two projections 20 and 21 and then inserting, for example in succession, the connection pin 31 in the through hole 18 of the projection 21, then in the through hole 26 of the end portion 25 of the shaft 23 and finally in the hole 18 of the projection 20. In this way the shaft 23 will be rotatingly constrained to the first hinge element 11, and can thus rotate around the connection and rotation pin 31. Obviously, the shaft 23 can be fixed to the first hinge or joint element 11 by means of alternative procedures; for example, the connection and rotation pin 31 can be inserted first in the through hole 18 of the projection 20, then in the through hole 26 of the end portion 25 of the shaft 23 and finally in the hole 18 of the projection 21. Furthermore, one of the two holes 18 can be blind (not through) and even provided with an inner thread suited to be engaged with a corresponding thread made on the end portion of the pin 31 opposite the end portion on which, in order to fix the shaft 23 to the first hinge element 11, a screwdriver or similar tool or device can be used.

Always with reference to FIG. 2a, it can be observed that the shaft 23 comprises one portion with substantially cylindrical cross section (although, as can be understood from the following description, different cross sections are possible) extending from the first end portion 25.

In turn, the substantially cylindrical portion comprises a first intermediate portion 41, adjacent to said first end portion 25, a second intermediate portion 40 adjacent to said first intermediate portion 41 and interposed between said first intermediate portion 41 and a second end portion 24, said second end portion 24 being opposite the first end portion 25. The second hinge or joint element 13 also comprises a through hole 17, suited to allow the passage therethrough of the cylindrical part of the shaft 23, as well as to partially house said cylindrical part of said shaft 23. In particular, when the assembly has been completed as shown in FIG. 2b, the first intermediate portion 41 of said shaft 23 will be housed in the through hole 17 of the second hinge or joint element 13, while both the second intermediate portion 40 and the second end portion 24 of the shaft 23 will be positioned outside said second hinge element 13, on the portion or side of said hinge element 13 opposite the first hinge element 11 and therefore the first end portion 25 of the shaft 23. The through hole 17 will therefore have cross section and dimensions corresponding to the cross section and dimensions of the cylindrical portion of the shaft 23, or at least of its first intermediate portion 41, in such a way as allow the passage of the shaft 23 therethrough, and therefore to allow the first intermediate portion 41 to be housed therein.

According to the embodiment of the present invention illustrated in FIGS. 2a and 2b, the hinge or joint 10 also comprises an elastic element (elastic means, comprising in the example an helical spring) 27 arranged on the shaft 23 located, in particular, on its second intermediate portion 40. In other words, said elastic element 27 is arranged so that the second intermediate portion 40 of the shaft 23 is housed or accommodated in the internal space defined by the helical spring 27. A fixing element 28 makes it possible to fix the helical spring 27 to the shaft 23; for this purpose, the fixing element 28 can for example comprise an inner seat 29 (for example, a through or blind hole) suited to house at least partially the second end portion 24 of the shaft 23, as well as an inner thread 30 suited to engage with a corresponding outer thread (not illustrated in the figures) created in the second end portion 24 of the shaft 23. Obviously, other solutions can be adopted to secure the fixing element 28 to the shaft 23 (and therefore the elastic element 27 to the second intermediate portion 40 of the shaft 23); for example, the element 28 can be welded, glued, pressure-fitted or even obtained by riveting the end portion 24 of the shaft 23. It should however be noticed that the solution including an element 28 that is screwed onto the end portion 24 of the shaft 23 makes it possible to adjust the spring compression and therefore, as explained here below, the functions and operations of the joint or hinge 10.

According to the embodiment of the present invention shown in FIGS. 2a and 2b, the assembly operations of the joint or hinge 10 continue after the shaft 23 has been fixed to the first hinge element 11 as described above, by inserting the second hinge element 13 in the cylindrical portion of the shaft 23 so that the first intermediate portion 41 is housed and accommodated in the through hole 17 of the second hinge element 13. Successively, the spring 27 is introduced in the part of the shaft 23 that projects from the hinge element 13, so that at least the second intermediate portion 40 of the shaft 23 is housed and accommodated in the internal space defined by the same helical spring 27. Finally, the fixing element 28 is applied to the end portion 24 of the shaft 23, so that the spring 27 is compressed between the second hinge element 13 and the fixing element 28. In this way, the second hinge or joint element 13 will be pushed towards the first fixing element 11 by the spring, so that the surface 38 of the second hinge or joint element rests against a corresponding contact surface of the first end portion 25 of the shaft 23. In this way the mutual arrangement of the components of the hinge or joint 10 shown in particular in FIG. 2b will be obtained.

As an alternative to the assembly procedure described above, it will be possible to assemble first the parts 23, 15, 27 and 28 and successively the element 11 by means of the screw 31.

The functions of the helical spring 27, in addition to those already described above, can be summed up as follows. It is possible to observe in FIG. 2a that the first end portion 25 of the shaft 23 comprises a curved surface facing towards the first hinge element 11 and opposing the cylindrical portion of the shaft 23. The rotation of the shaft 23 will therefore be conditioned by the action of the spring 27, which means that the rotation of the shaft will cause the compression of the spring; the spring will thus tend to make the shaft 23, and therefore the second hinge element 13, return to predefined positions with respect to the first hinge element 11, and in particular in the position in which the shaft 23 and the second hinge element 13 are substantially parallel to the first hinge element 11 (open position of the hinge 10), as well as in the position in which the shaft 23 and the second hinge element 13 form with the first hinge element 11 a predefined angle that in the example illustrated herein is substantially a 90° angle (closed position of the hinge or joint 10). The closed and open positions of the hinge or joint 10 respectively correspond to the closed and open positions of the eyeglasses 100 previously described with reference to Figures from 1a to 1d.

The first advantages offered by the embodiment of the hinge or joint 10 shown in FIGS. 2a and 2b are clear. For example, the hinge can be preassembled as shown in FIG. 2b, and then applied to a pair of eyeglasses 100 (between the front portion and the temple of the same) as previously described with reference to Figures from 1a to 1d, and therefore with the fixing screws 11v already housed in the through holes 15 of the first hinge element 11, and the screws 13v already housed in the through holes 16 of the second hinge element 13. Furthermore, the minimum space occupied by the spring 27 together with the shaft 23 and the fixing element 28 is evident. The fact that the shaft 23 is partially housed in the internal space defined by the spring 27, in fact, will make it possible to comfortably house the set of components including the shaft 23, the spring 27, and the fixing element 28 inside a component of a pair of eyeglasses that can even be very small, for example within a temple or side 102 as shown in FIGS. 1b and 1c. It will thus be possible to avoid the negative aesthetic effects that appear when component parts of the hinge or joint must be positioned outside the components of a pair of eyeglasses.

Furthermore, said solution makes it possible to maximise the elastic force generated by the elastic element 27 according to its overall dimensions, considerably improving the performance of the hinge 10 compared to the known solutions.

FIG. 3c illustrates one of the possible functions allowed by the embodiment of the hinge 10 described above with reference to FIGS. 2a and 2b. It is clear from FIG. 3c, in fact, that, as schematically indicated by the arrow, the hinge element 13 can be rotated with respect to the shaft 23 and therefore with respect to the first hinge element 11. In the same way, a temple 102 of a pair of eyeglasses 100 fixed to the front portion 101 of the same pair of eyeglasses 100 by means of the hinge or joint 10 according to this embodiment of the present invention, can be rotated around an axis that substantially coincides with the longitudinal axis of the same temple or side 102.

A further embodiment of the present invention is described here below with reference to FIGS. 3a and 3b; as usual, in FIGS. 3a and 3b, the component parts or characteristics of the joint 10 already described are identified by the same reference numbers.

The embodiment of the hinge 10 according to the present invention illustrated in FIGS. 3a and 3b is particularly useful in the cases where the possibility of rotation of the second hinge element 13 with respect to the first hinge element 11 is perceived as a disadvantage and therefore should preferably be avoided. For this purpose, as shown in particular in FIG. 3a, the first intermediate portion 41 of the shaft 23 and the through hole 17 of the second hinge element 13 have matching transversal cross section and dimensions, in particular a substantially rectangular (or square, or even hexagonal or polygonal, in any case not circular) cross section; in this way, when the first intermediate portion 41 of the shaft 23 is housed in the through hole 17, the hinge or joint element 13 cannot rotate with respect to the shaft 23, due to the engagement of the first intermediate portion 41 of the shaft 23 in the seat or through hole 17. Since it is not possible to rotate the shaft 23 with respect to the first hinge element 11 (due to the engagement of the first end portion 25 in the space 22 between the projections 20 and 21 of the first hinge element 11, as well as to the engagement of the constraint and rotation pin 31 (not illustrated in FIG. 3a) in the through hole 26, it will not be possible to rotate the second hinge element 13 with respect to the first hinge element 11, and not even to rotate the temple or side 102 of a pair of eyeglasses 100 with respect to the front portion 101 of the same eyeglasses.

A further characteristic of this embodiment of the invention is related to the fact that the end portion 25 of the shaft 23 also comprises a projection 35 that, when the first intermediate portion 41 of said shaft 23 is correctly housed in the through hole 17 as shown in FIG. 3b, overlaps the upper plane surface 37 of the second hinge element 13; in this way, the projection 35 will exert a certain pressure on the second hinge element 13, thus facilitating the positioning of said second hinge element 13 on the shaft 23, as the same hinge element 13 will tend to remain in position on the shaft 23 even before the helical spring 27 is fixed.

In the particular case of the embodiment just described with reference to FIGS. 3a and 3b, the first intermediate portion 41 of the shaft 23 is defined and delimited by two substantially plane, parallel and opposite main surfaces that are oriented so as to be substantially perpendicular to the constraint and rotation pin 31. This solution will therefore be preferable if it is desirable or necessary to reduce or limit the size and overall dimensions of the second hinge element 13 in the direction parallel to the section where the constraint and rotation pin 31 extends, as the thickness of the first intermediate portion 41 of the shaft 23 (substantially corresponding to the distance between the two plane, parallel and opposing surfaces that delimit said first intermediate portion 41) can be chosen as desired and according to the needs or circumstances.

An alternative to the embodiment of the invention just described with reference to FIGS. 3a and 3b is illustrated in FIG. 6a, in which once again component parts or characteristics of the hinge or joint according to the invention already described in other figures are identified by the same reference numbers.

The embodiment of the invention represented in FIG. 6a differs from the one represented in FIGS. 3a and 3b substantially due to the orientation of the first intermediate portion 41 of the shaft 23 and of the through hole 17 with matching shape and size obtained in the second hinge or joint element 13. In this case, in fact, said first intermediate portion 41 is still defined and delimited by two substantially plane, parallel and opposing surfaces, which however in this case are parallel to the plane on which the longitudinal axis of symmetry of the rotation and constraint pin 31 lies. This solution, which however still makes it possible to avoid undesired rotations of the second hinge element 13 with respect to the shaft 23, as well as of the shaft 23 with respect to the first hinge element 11, will be preferable in the cases where it is advisable or necessary to limit the size and overall dimensions of the second hinge element 13 along a direction perpendicular to the longitudinal axis of symmetry of the rotation or constraint pin 31. This solution, for example, if applied to a pair of eyeglasses as shown in FIGS. 1a and 1b, that is, with the second hinge element 13 housed in the temple or side 102 of the eyeglasses 100, will be preferable when it is necessary or advisable to limit the thickness of the temple or side 102; the solution shown in FIGS. 3a and 3b will be preferable, on the other hand, when it is necessary or advisable to limit the height (in the direction perpendicular to the thickness) of the temple or side 102 of the eyeglasses 100.

A further embodiment of the present invention is described here below with reference to FIG. 4a; in FIG. 4a, the component parts or characteristics of the present invention already described with reference to other figures are as usual identified by the same reference numbers.

The main characteristic of the embodiment of the hinge according to the present invention shown in FIG. 4a is related to the fact that the hinge or joint 10 comprises two substantially parallel shafts 23 rotatingly constrained to the first hinge element 11. For this purpose, said first hinge element 11 comprises two end or side projections 20 and 21, facing towards the second hinge element 13 and both provided with a through hole 26. A central projection 45 facing towards the second hinge element 13 is arranged between the side projections 20 and 21 in such a way as to define, together with said side projections 20 and 21, two housings 22. Each one of the end portions 25 of the two shafts 23 will thus be housed in one of said housings 22, and fixed therein through a rotation and constraint pin (not illustrated in FIG. 4a) as in the case of the embodiments described above, that is, with said rotation and constraint pin housed and accommodated in the through holes of the three projections 20, 21 and 45 (two side projections and a central projection), as well as in the through holes 26 of the two shafts 23. Each one of said two shafts can therefore be rotated around the rotation and constraint pin. Two through holes or seats 17 are obtained in the second hinge element 13 so that each of them can house and accommodate a first intermediate portion 41 of one of the two shafts 23. Each one of the second intermediate portions 40 of the two shafts 23 will thus be housed in the internal space defined by one of the two helical springs 27; finally, each one of the two helical springs will be fixed to one of the two shafts 23 through a fixing element suited to be engaged with the end portion 24 of one of the two shafts 23. The presence of the two substantially parallel shafts 23 will avoid undesired rotations of the second hinge or joint element 13 with respect to the first hinge element 11. Obviously, in the case of this individual embodiment, the first intermediate portions 41 of the two shafts 23, and therefore the corresponding through holes 17, can have circular cross section, and this will not affect the locking of the rotation of the second hinge element 13 with respect to the first hinge element 11 around an axis that is substantially parallel to the two shafts 23. First intermediate portions 41 with rectangular, square, etc and in any case not circular cross section can however be preferred in order to give more stability to the hinge or joint 10 and/or to simplify its assembly operations, for example by providing each of the two end portions 25 of the two shafts with a projection 35 suited to rest against the upper surface of the first hinge element (as in the case of the embodiment of the invention illustrated in FIGS. 3a and 3b).

In the embodiment of the hinge or joint according to the present invention shown in FIG. 5a, there are still two substantially parallel shafts 23 as in the embodiment previously described with reference to FIG. 4a, and therefore with first intermediate portions 41 with circular or non circular cross section and matching through holes or seats 17 obtained in the second hinge element 13 with corresponding cross section, therefore circular or non circular. The main difference between this embodiment of the invention and the other embodiments described above lies in that this embodiment includes the use of a connection element 60 (in addition to the rotation and constraint pin 31, not illustrated in FIG. 5a). Said further connection or fixing element 60 has an end portion suited to be engaged with a corresponding seat 61 in order to increase the stability and strength of the hinge or joint 10. For example, the end portion of the connection or fixing element 60 may comprise a threaded part suited to be engaged with a corresponding thread obtained in the seat 61 which can therefore be through or blind. This solution offers a great freedom of choice concerning the shape of the two shafts 23, in particular the shape of the cross section of their first intermediate parts 41 that can therefore be circular or not, while the through holes 17 housing said first intermediate parts 41 obtained in the second hinge element 13 will have a cross section with shape matching that of said first intermediate portions 41.

In the further embodiment of the hinge or joint according to the present invention that is described below with reference to FIGS. 7a and 7b (in which, again, component parts or characteristics of the same hinge previously described with reference to other figures are identified by the same reference numbers) even the second hinge or joint element 13 is provided with two projections 45 and 46 having the characteristic shape of a fork and facing towards the shaft 23 and the first hinge or joint element 11. The expression "fork shape" means two projections 45 and 46 both provided with two spaced tines (perpendicular to the distance between the two projections 45 and 46), so that each of them defines a housing that, as clearly explained in the following description, will allow the constraint and rotation pin 31 to be housed between the two tines. In this case, therefore, the thickness of the end portion 25 of the shaft 23 (parallel to the longitudinal axis of the constraint or rotation pin 31) substantially will not correspond to the inner distance between the two projections 20 and 21 (and therefore substantially will not correspond to the width of the internal space 22 defined by the two projections 20 and 21) but rather the width of the internal space 22 (the inner distance between the two projections 20 and 21) will substantially correspond to the sum of the thickness of the end portion 25 of the shaft 23 and the thicknesses of the two projecting portions 45 and 46 of the second hinge element 13. Therefore, once the assembly of the hinge 10 has been completed (as shown in FIG. 7b), the end portion 25 of the shaft 23 will be positioned substantially at the centre of the internal space 22 and therefore substantially at the same distance from the two projections 20 and 21, while the projections 45 and 46 of the second hinge element 13 will be respectively positioned between the end portion 25 of the shaft 23 and the projection 21, and between the end portion 25 of the shaft 23 and the projection 20. Therefore, the rotation and constraint pin 31 (see FIG. 7b) will be housed and accommodated partially in the through holes (one may even be blind and threaded inside) of the two projections 20 and 21, partially between the tines of the two projections 45 and 46 (or, in other words, in the seats defined by said tines), and partially in the through hole 26 of the end portion 25 of the shaft 23. Obviously, there are many possible variants to this embodiment; for example, this embodiment guarantees a large freedom of choice regarding the shape of the cross section of the first intermediate portion 41 of the shaft 23 and of the corresponding through hole 17 (which can therefore be circular or not), and also regarding the number of shafts 23 (which can therefore be one, two or even more) etc. Undesired rotations of the second hinge element 13 with respect to the shaft 23 (and therefore with respect to the first hinge element 11) will be avoided thanks to the action of the two projections 45 and 46 of the second hinge element 13, housed in the internal space 22 defined by the two projections 20 and 21 of the first hinge element 11. In the same way, the projections 45 and 46 can have a shape different from the fork shape shown in FIG. 8a, for example they may have a shape similar to that of the projections 20 and 21, and therefore they can be provided with through holes or slots similar to the through holes 18 of the projections 20 and 21.

In the further embodiment of the hinge or joint 10 according to the present invention that is described here below with reference to Figures from 8a to 8c, the first end portion 25 of the shaft 23 is provided with a coupling tooth 50 that projects from said end portion 25. In the same way, in the housing 22 defined by the projections 20 and 21, in particular in the part of said housing that joins the two projections 20 and 21 and is thus perpendicular to them, there is recess 51 defining a stop element 52, with a surface substantially parallel to the inner surfaces (facing towards the inside of the space 22) of the two projections 20 and 21. As shown in FIGS. 8b and 8c, and in particular in the enlargement of FIG. 8b, when the end portion 25 of the shaft 23 is housed inside the housing 22, and therefore with the rotation and constraint pin 31 arranged through the through hole 26 of the first end portion 25, the tooth 50 is housed at least partially in the seat or recess 51. The rotation of the shaft 23 around the rotation and constraint pin 31 is thus limited in one of the two possible rotation directions by the tooth 50 that rests against and engages with the stop element 52. In this rotation direction, the maximum rotation amplitude can therefore be established and defined by properly sizing both the tooth 50 and the stop element 52. This solution can be applied in particular in the case of hinges of the extra flex type, in particular when it is desirable to limit or uniform the amplitude of the extra opening. Obviously, the solution including the stop tooth 50 and the cavity or recess 51 with the stop element 52 can be applied to all the embodiments previously described, in particular both to the embodiments with single shaft and to those with several shafts, to the embodiments with first intermediate portion 41 of the shaft 23 with cross section in any shape, to both the embodiments shown in FIG. 3a and in FIG. 6a, and so on. Furthermore, the projections 45 and 46 of the second hinge element 13 can even be omitted, thus opting for one of the alternative solutions described above and intended to limit or avoid the undesired rotations of the second hinge element 13 with respect to the first hinge element 11.

The above description has therefore shown that the hinge or joint according to the present invention achieves the set objects and aims, overcoming the problems that are typical of the joints or hinges known in the state of the art. For example, the hinge or joint according to the present invention makes it possible to avoid and eliminate undesired rotations of a hinge element with respect to the other around a rotation axis that is substantially parallel to the connection shaft between the two hinge elements, can be applied so as to be hidden in eyeglasses of different types (by simply creating in suitable parts of the eyeglasses housings for the first and the second hinge element, and thanks to the fact that the overall dimensions of at least one of the two hinge elements is limited by housing the shaft at least partially in the helical spring) and therefore avoiding undesired aesthetic effects, guarantees improved mechanical strength (thanks to the reduced number of components that therefore can be carried out so that each of them guarantees the desired strength), is easier to assemble (the components of the hinge are kept together by simply fixing the helical spring to the shaft), can reduce the amplitude of the extra opening (by means of the counteracting or coupling tooth obtained in the first end portion of the shaft) etc.

It is important to underline, however, that the present invention is not limited to the embodiments described above, and that all the changes that can be made to the embodiments described and illustrated herein and that are clear and obvious to the person skilled in the art fall within the scope of the present invention. For example, the solution illustrated in FIG. 8a can be applied to any one of the other embodiments described and illustrated herein; in the same way, and always by way of example, the solution illustrated in FIG. 7a and all its obvious variants (projections 45 and 46 of the second hinge element 13) can be applied to each one of the other embodiments described and illustrated in the drawings. It should also be pointed out that the elastic element or helical spring illustrated in all the embodiments described above and constituting the elastic means of the joint can be replaced by other equivalent elements, like for example elements comprising an elastomer. The scope of the present invention is therefore expressed in the following claims.

What is claimed is:

1. An elastic miniaturized hinge suited to be used for eyeglasses having temples, said hinge comprising:
   a first element suited to be fixed to the front portion of said eyeglasses, along with;
   a second element suited to be fixed to one of the temples of said eyeglasses, said first and second elements being rotatably fixed to each other by means of,
   a shaft, a first end portion of said shaft being rotatably fixed to said first element by means of,
   a rotation pin so as to be adapted to be rotated around said rotation pin,
   a first intermediate portion of said shaft close to said first end portion being received in a through hole formed in said second element,
   said hinge further comprising elastic means having an internal space and adapted to counteract the rotation of said shaft and therefore of said second element with respect to said first element,
   a second intermediate portion of said shaft close to said first intermediate portion and located on the opposite side with respect to said first end portion extends outside of said second element and is received in the internal space defined by elastic means which are maintained in position by,
   fixing means applied to the second end portion of said shaft opposite to said first end portion, so that said hinge may be preassembled by rotatably fixing said first and second elements by means of said shaft, by inserting said second intermediate portion of said shaft into the internal space defined by said elastic means and by applying said fixing means to said second end portion of said shaft, in that said first element is adapted to be alternatively inserted into and removed from a corresponding seat of said front portion of said eyeglasses, and in that said second element is adapted to be alternatively inserted into and removed from a corresponding seat of one of the temples.

2. Hinge as claimed in claim 1, further wherein:
   said first element comprises two through holes extending parallel to the direction along which said first element is inserted into said seat, each of said two through holes being adapted to house a fixing screw, and in that said second element comprises two through holes extending parallel to the direction along which said second element is inserted into said seat, each of the two through holes being adapted to house a fixing screw, so that said first and second elements may be fixed to said front portion and on of the temples, respectively, by means of said fixing screws.

3. Hinge as claimed in claim 2, wherein:
   said elastic means comprise a helical spring.

4. Hinge as claimed in claim 1, wherein:
   said first end portion of said shaft has a substantially rectangular cross section and is defined by two substantially plane and parallel opposing surfaces, said first end portion being received at least partially in an internal space defined by two substantially plane and parallel projections of said first element.

5. Hinge as claimed in claim 4, wherein:
   said rotation pin is received in a through hole formed in said first end portion of said shaft and in two further through holes each formed in one of said two projections of said first element.

6. Hinge as claimed in claim 4, wherein:
   said first end portion of said shaft is received at least partially in an internal space defined by two substantially plane and parallel projections which protrude from said second element and are oriented so as to face toward said first element.

7. Hinge as claimed in claim 1, wherein:
   said first intermediate portion of said shaft has a substantially circular cross section and in that the through hole of said second element in which said first intermediate portion is received has cross section and dimensions substantially matching those of said first intermediate portion of said shaft.

8. Hinge as claimed in claim 1, wherein:
   said first intermediate portion of said shaft has a substantially rectangular cross-section and in that the through hole of said second element in which said first intermediate portion is received has cross section and dimensions substantially matching those of said first intermediate portion of said shaft so as to avoid or at least hinder possible rotations of said second element around a rotation axis parallel to said shaft.

9. Hinge as claimed in claim 8, wherein:
   said first intermediate portion with substantially rectangular cross section is defined by two main surfaces that are substantially perpendicular to said rotation pin.

10. Hinge as claimed in claim 8, wherein:
    said first intermediate portion with substantially rectangular cross section is defined by two main surfaces that are substantially parallel to the plane on which said rotating pin lies.

11. Hinge as claimed in claim 1, wherein:
    said first end portion comprises a protruding stop element suited to be engaged with counteracting means carried out in said first element so as to define and limit the rotation angle of said second element with respect to said first element.

12. Hinge as claimed in claim 1, wherein:
    said joint comprises at least two shafts, both comprising a first end portion rotatably fixed to said first element, both first intermediate portions of said at least two shafts adjacent to said first end portions being received in two corresponding through holes formed in said second element, the second intermediate portions of said at least two shafts opposite said first end portions and adjacent to said first intermediate portions being received respectively in the internal spaces defined by elastic means maintained in position by corresponding fixing means applied to said at least two shafts, so that the rotation of said at least two shafts and therefore of said second element with respect to said first element is counteracted by the action of said elastic means.

13. Hinge as claimed in claim 12, wherein:
    said elastic means comprise two helical springs.

14. Hinge as claimed in claim 12, wherein:
    said fixing means are fixed to the second end portions of said shafts.

15. A method for assembling an elastic miniaturized hinge as claimed in claim 1, said method comprising:

(a) rotatably fixing said shaft to said first element by means of said rotation pin;
(b) inserting said first intermediate portion of said shaft into said through hole of said second element;
said method further comprises:
(c) inserting said second intermediate portion of said shaft into the internal space defined by said elastic means, and
(d) applying said fixing means to said second end portion of said shaft so as to compress said elastic means between said second element and said fixing means, thus fixing said second element to said shaft.

16. A method as claimed in claim 15, wherein:
step (a) is carried out prior to steps (b) to (d).

17. A method as claimed in claim 15, wherein:
steps (b) to (d) are carried out prior to step (a).

18. A hinge attaching a front portion of eyeglases to a temple of the eyeglasses comprising:
a first hinge element adapted to attach to either the front portion or the temple;
a second hinge element adapted to attach to either the front portion or the temple;
a constraint element pivotally attached to said first hinge element and passing through a through hole in said second hinge element;
a helical spring having an internal space placed over said constraint element;
a fixing element placed on the end of said constraint element, whereby said helical spring is retained between said fixing element and said second hinge element;
a first pair of fasteners passing through said first hinge element on either side of said constraint element and attaching said first hinge element to either the front portion or the temple; and
a second pair of fasteners passing through said second hinge element on either side of the through hole and attaching said second hinge element to either the front portion or the temple,
whereby the hinge may be assembled prior to attaching the hinge to the front portion and the temple.

19. A hinge as in claim 18 further comprising:
means, formed on said constraint element, for preventing rotation of said constraint element relative to said second hinge element.

* * * * *